United States Patent
Kim et al.

(10) Patent No.: US 8,665,907 B2
(45) Date of Patent: Mar. 4, 2014

(54) METHOD OF CONSTRUCTING A FRAME BY MULTIPLEXING SUBFRAMES HAVING DIFFERENT CP LENGTH

(75) Inventors: Dong Cheol Kim, Gyeonggi-do (KR); Min Seok Noh, Gyeonggi-do (KR); Yeong Hyeon Kwon, Gyeonggi-do (KR); Jin Sam Kwak, Gyeonggi-do (KR); Sung Ho Moon, Gyeonggi-do (KR); Seung Hee Han, Gyeonggi-do (KR); Hyun Woo Lee, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 393 days.

(21) Appl. No.: 13/055,658

(22) PCT Filed: Aug. 26, 2009

(86) PCT No.: PCT/KR2009/004764
§ 371 (c)(1),
(2), (4) Date: Jan. 24, 2011

(87) PCT Pub. No.: WO2010/024588
PCT Pub. Date: Mar. 4, 2010

(65) Prior Publication Data
US 2011/0268135 A1    Nov. 3, 2011

Related U.S. Application Data

(60) Provisional application No. 61/092,737, filed on Aug. 28, 2008.

(30) Foreign Application Priority Data

Jul. 20, 2009    (KR) ........................ 10-2009-0065822

(51) Int. Cl.
H04J 3/16    (2006.01)

(52) U.S. Cl.
USPC ............................................ 370/474; 370/477

(58) Field of Classification Search
None
See application file for complete search history.

(56) References Cited

U.S. PATENT DOCUMENTS

| | | | |
|---|---|---|---|
| 7,026,952 B2 * | 4/2006 | Krueger | 340/855.3 |
| 7,496,113 B2 * | 2/2009 | Cai et al. | 370/474 |
| 8,175,119 B2 * | 5/2012 | Zhang et al. | 370/474 |
| 2007/0258358 A1 * | 11/2007 | Cho et al. | 370/208 |
| 2009/0122771 A1 * | 5/2009 | Cai | 370/338 |
| 2009/0207853 A1 * | 8/2009 | Mueller-Weinfurtner et al. | 370/465 |
| 2011/0103406 A1 * | 5/2011 | Cai et al. | 370/480 |
| 2012/0287842 A1 * | 11/2012 | Bui | 370/312 |

FOREIGN PATENT DOCUMENTS

| | | |
|---|---|---|
| KR | 10-2008-0016390 | 2/2008 |
| WO | 2008/097038 | 8/2008 |

* cited by examiner

*Primary Examiner* — Min Jung
(74) *Attorney, Agent, or Firm* — Lee, Hong, Degerman, Kang & Waimey

(57) ABSTRACT

The present invention relates to a broadband wireless access system, and more particularly, to a frame structure to which OFDM symbols having a cyclic prefix are transmitted. A method of constructing a frame in a broadband wireless access system according to one embodiment of the present invention comprises including one or more first subframes in the frame, the first subframes including a plurality of symbols having a cyclic prefix of a first length; and including one or more second subframes in the frame, the second subframes including a plurality of symbols having a cyclic prefix of a second length different from the first length, wherein the number of the first subframes and the number of the second subframes are determined considering an idle time for which effective symbols are not included in the frame.

16 Claims, 15 Drawing Sheets

Fig. 6

| Base: 1/16Tu | SF0 (retain) | SF1 | SF2 | SF3 | SF4 | SF5 | SF6 | SF7 | Extra Idle Time | Original IT | Total Idle Time | Total IT -97.11 |
|---|---|---|---|---|---|---|---|---|---|---|---|---|
| | 7 | 6 | 6 | 6 | 6 | 6 | 6 | 6 | | | | |
| 1sub | 699.77 | 583 | 583 | 583 | 583 | 583 | 485.55 (5sym) | 617 (6sym) | 63.45 | 45.71 | 109.16 | 109.16-97.11 |
| 1sub (5sym) | 699.77 | 583 | 583 | 583 | 583 | 583 | 583 | 514.285 (5sym) | 68.715 | 45.71 | 114.425 | 114.25-97.11 |
| 2sub | 699.77 | 583 | 583 | 583 | 583 | 485.55 (5sym) | 617 (6sym) | 617 (6sym) | 29.46 | 45.71 | 75.17 | |
| 2sub (5sym) | 699.77 | 583 | 583 | 583 | 583 | 583 | 514.285 (5sym) | 514.285 (5sym) | 137.43 | 45.71 | 183.14 | 183.14-97.11 |
| 2sub (6sym+5sym) | 699.77 | 583 | 583 | 583 | 583 | 583 | 617 (6sym) | 514.285 (5sym) | 34.715 | 45.71 | 80.425 | |
| 3sub | 699.77 | 583 | 583 | 583 | 583 | 617 (6sym) | 514.285 (5sym) | 514.285 (5sym) | 0.7156 | 45.71 | 46.4256 | |
| 4sub | 699.77 | 583 | 583 | 583 | 617 (6sym) | 617 (6sym) | 514.285 (5sym) | 514.285 (5sym) | 69.43 | 45.71 | 115.14 | |
| 5sub | 699.77 | 583 | 583 | 617 (6sym) | 617 (6sym) | 617 (6sym) | 514.285 (5sym) | 514.285 (5sym) | 35.43 | 45.71 | 81.14 | |
| 6sub | 699.77 | 583 | 617 (6sym) | 617 (6sym) | 617 (6sym) | 617 (6sym) | 514.285 (5sym) | 514.285 (5sym) | 1.44 | 45.71 | 47.15 | |
| 7sub | 699.77 | 617 (6sym) | 617 (6sym) | 617 (6sym) | 617 (6sym) | 514.285 (5sym) | 514.285 (5sym) | 514.285 (5sym) | 70.16 | 45.71 | 115.87 | |

Fig. 7

| Base: 1/16Tu | SF0 (retain) | SF1 | SF2 | SF3 | SF4 | SF5 | SF6 | Extra Idle Time | Orignal IT | Total Idle Time | Total IT -97.11 |
|---|---|---|---|---|---|---|---|---|---|---|---|
| | 7 | 6 | 6 | 6 | 6 | 6 | 6 | | | | |
| 1sub | 699.77 | 583 | 583 | 583 | 583 | 485.55 (5sym) | 617 (6sym) | 63.45 | 45.71 | 109.16 | 109.16-97.11 |
| 1sub (5sym) | 699.77 | 583 | 583 | 583 | 583 | 583 | 514.285 (5sym) | 68.715 | 45.71 | 114.425 | 114.25-97.11 |
| 2sub | 699.77 | 583 | 583 | 583 | 485.55 (5sym) | 617 (6sym) | 617 (6sym) | 29.46 | 45.71 | 75.17 | |
| 2sub (5sym) | 699.77 | 583 | 583 | 583 | 583 | 514.285 (5sym) | 514.285 (5sym) | 137.43 | 45.71 | 183.14 | 183.14-97.11 |
| 2sub (6sym+5sym) | 699.77 | 583 | 583 | 583 | 583 | 617 (6sym) | 514.285 (5sym) | 34.715 | 45.71 | 80.425 | |
| 3sub | 699.77 | 583 | 583 | 583 | 617 (6sym) | 617 (6sym) | 514.285 (5sym) | 0.7156 | 45.71 | 46.4256 | |
| 4sub | 699.77 | 583 | 583 | 617 (6sym) | 617 (6sym) | 514.285 (5sym) | 514.285 (5sym) | 69.43 | 45.71 | 115.14 | |
| 5sub | 699.77 | 583 | 617 (6sym) | 617 (6sym) | 617 (6sym) | 514.285 (5sym) | 514.285 (5sym) | 35.43 | 45.71 | 81.14 | |
| 6sub | 699.77 | 617 (6sym) | 617 (6sym) | 617 (6sym) | 617 (6sym) | 514.285 (5sym) | 514.285 (5sym) | 1.44 | 45.71 | 47.15 | |

Fig. 8

| Base: 1/16Tu | SF0 (mod) | SF1 | SF2 | SF3 | SF4 | SF5 | SF6 | SF7 | Extra Idle Time | Orignal IT | Total Idle Time | Total IT -97.11 |
|---|---|---|---|---|---|---|---|---|---|---|---|---|
| | 6 | 6 | 6 | 6 | 6 | 6 | 6 | 7 | | | | |
| 1sub (6sym) | 583 | 583 | 583 | 583 | 583 | 583 | 583 | 679.77 | 1262.77 | | | |
| 1sub (7sym) | 583 | 583 | 583 | 583 | 583 | 583 | 583 | 617 (6sym) | 62.77 | 45.71 | 108.48 | 11.37 |
| 2sub | 583 | 583 | 583 | 583 | 583 | 583 | 583 | 719.999 (7sym) | -40.229 | 45.71 | 5.481 | |
| 3sub | 583 | 583 | 583 | 583 | 583 | 583 | 617 (6sym) | 617 (6sym) | 28.77 | 45.71 | 74.48 | |
| 4sub | 583 | 583 | 583 | 583 | 583 | 617 (6sym) | 617 (6sym) | 617 (6sym) | -5.23 | 45.71 | 40.48 | |
| 4sub-1 | 583 | 583 | 583 | 583 | 617 (6sym) | 617 (6sym) | 617 (6sym) | 617 (6sym) | -39.23 | 45.71 | 6.48 | |
| 5sub | 583 | 583 | 583 | 617 (6sym) | 617 (6sym) | 617 (6sym) | 617 (6sym) | 514.285 (5sym) | 63.485 | 45.71 | 109.195 | 12.085 |
| 6sub | 583 | 583 | 617 (6sym) | 617 (6sym) | 617 (6sym) | 617 (6sym) | 617 (6sym) | 514.285 (5sym) | 29.485 | 45.71 | 75.195 | |
| 7sub | 583 | 617 (6sym) | 617 (6sym) | 617 (6sym) | 617 (6sym) | 617 (6sym) | 617 (6sym) | 514.285 (5sym) | -4.515 | 45.71 | 41.195 | |
| 7sub-1 | 583 | 617 (6sym) | 617 (6sym) | 617 (6sym) | 617 (6sym) | 617 (6sym) | 617 (6sym) | 514.285 (5sym) | -38.515 | 45.71 | 7.195 | |
| | 583 | 617 (6sym) | 617 (6sym) | 617 (6sym) | 617 (6sym) | 617 (6sym) | 514.285 (5sym) | 514.285 (5sym) | 64.2 | 45.71 | 109.91 | 12.8 |

Fig. 9

| Base: 1/16Tu | SF0 (mod) | SF1 | SF2 | SF3 | SF4 | SF5 | SF6 | Extra Idle Time | Orignal IT | Total Idle Time | Total IT -97.11 |
|---|---|---|---|---|---|---|---|---|---|---|---|
| 1sub (6sym) | 6 | 6 | 6 | 6 | 6 | 6 | 6 | | | | |
| 1sub (7sym) | 583 | 583 | 583 | 583 | 583 | 583 | 617 (6sym) | 62.77 | 45.71 | 108.48 | 11.37 |
| 2sub | 583 | 583 | 583 | 583 | 583 | 583 | 719.999 (7sym) | -40.229 | 45.71 | 5.481 | |
| 3sub | 583 | 583 | 583 | 583 | 583 | 617 (6sym) | 617 (6sym) | 28.77 | 45.71 | 74.48 | |
| 4sub | 583 | 583 | 583 | 583 | 617 (6sym) | 617 (6sym) | 617 (6sym) | -5.23 | 45.71 | 40.48 | |
| 4sub-1 | 583 | 583 | 583 | 617 (6sym) | 617 (6sym) | 617 (6sym) | 617 (6sym) | -39.23 | 45.71 | 6.48 | |
| 5sub | 583 | 583 | 617 (6sym) | 617 (6sym) | 617 (6sym) | 617 (6sym) | 514.285 (5sym) | 63.485 | 45.71 | 109.195 | 12.085 |
| 6sub | 583 | 617 (6sym) | 617 (6sym) | 617 (6sym) | 617 (6sym) | 617 (6sym) | 514.285 (5sym) | 29.485 | 45.71 | 75.195 | |
| | 583 | 617 (6sym) | 617 (6sym) | 617 (6sym) | 617 (6sym) | 617 (6sym) | 514.285 (5sym) | -4.515 | 45.71 | 41.195 | |

Fig. 10

| Base : 1/8Tu | SF0 | SF1 | SF2 | SF3 | SF4 | SF5 | SF6 | SF7 | 1/16symbol configuration | Extra Idle Time | Orignal IT | Total Idle Time |
|---|---|---|---|---|---|---|---|---|---|---|---|---|
| | 6sym | 6sym | 6sym | 6sym | 6sym | 6sym | 6sym | 5sym | | | | |
| 1sub | 617 | 617 | 617 | 617 | 617 | 617 | 617 | 514.285 | | | | |
| 2sub | 617 | 617 | 617 | 617 | 617 | 617 | 617 | 485.55 (5sym) | 5sym | 28.735 | 102.82 | 131.55 |
| 2sub-1 | 617 | 617 | 617 | 617 | 617 | 617 | 583 (6sym) | 583 (6sym) | 6sym x 2 | -34.715 | 102.82 | 68.105 |
| 3sub | 617 | 617 | 617 | 617 | 617 | 617 | 583 (6sym) | 485.55 (5sym) | 6sym x 1 + 5sym x 1 | 62.735 | 102.82 | 165.555 |
| 3sub-1 | 617 | 617 | 617 | 617 | 617 | 617 | 583 (6sym) | 583 (6sym) | 6sym x 3 | -0.715 | 102.82 | 102.105 |
| 4sub | 617 | 617 | 617 | 617 | 617 | 583 (6sym) | 583 (6sym) | 485.55 (5sym) | 6sym x 2 + 5sym x 1 | 96.735 | 102.82 | 199.555 |
| 5sub | 617 | 617 | 617 | 617 | 583 (6sym) | 583 (6sym) | 583 (6sym) | 583 (6sym) | 6sym x 4 | 33.285 | 102.82 | 136.105 |
| 5sub | 617 | 617 | 617 | 583 (6sym) | 583 (6sym) | 583 (6sym) | 583 (6sym) | 583 (6sym) | 6sym x 5 | 67.285 | 102.82 | 170.105 |
| 5sub-1 | 617 | 617 | 583 (6sym) | 583 (6sym) | 583 (6sym) | 583 (6sym) | 583 (6sym) | 679.77 (7sym) | 6sym x 4 + 7sym x 1 | -29.705 | 102.82 | 73.115 |
| 6sub | 617 | 617 | 583 (6sym) | 583 (6sym) | 583 (6sym) | 583 (6sym) | 583 (6sym) | 679.77 (7sym) | 6sym x 5 + 7sym x 1 | 4.295 | 102.82 | 107.115 |
| 7sub | 617 | 583 (6sym) | 583 (6sym) | 583 (6sym) | 583 (6sym) | 583 (6sym) | 583 (6sym) | 679.77 (7sym) | 6sym x 6 + 7sym x 1 | 38.295 | 102.82 | 141.115 |

Fig. 11

| Base: 1/8Tu | SF0 | SF1 | SF2 | SF3 | SF4 | SF5 | SF6 | 1/16symbol configuration | Extra Idle Time | Orignal IT | Total Idle Time |
|---|---|---|---|---|---|---|---|---|---|---|---|
|  | 6sym | 6sym | 6sym | 6sym | 6sym | 6sym | 5sym |  |  |  |  |
| 1sub | 617 | 617 | 617 | 617 | 617 | 617 | 514.285 |  |  |  |  |
| 2sub | 617 | 617 | 617 | 617 | 617 | 617 | 485.55 (5sym) | 5sym | 28.735 | 102.82 | 131.55 |
| 2sub-1 | 617 | 617 | 617 | 617 | 617 | 583 (6sym) | 583 (6sym) | 6sym x 2 | -34.715 | 102.82 | 68.105 |
| 3sub | 617 | 617 | 617 | 617 | 617 | 583 (6sym) | 485.55 (5sym) | 6sym x 1 + 5sym x 1 | 62.735 | 102.82 | 165.555 |
| 3sub-1 | 617 | 617 | 617 | 617 | 583 (6sym) | 583 (6sym) | 583 (6sym) | 6sym x 3 | -0.715 | 102.82 | 102.105 |
| 4sub | 617 | 617 | 617 | 583 (6sym) | 583 (6sym) | 583 (6sym) | 485.55 (5sym) | 6sym x 2 + 5sym x 1 | 96.735 | 102.82 | 199.555 |
| 5sub | 617 | 617 | 583 (6sym) | 583 (6sym) | 583 (6sym) | 583 (6sym) | 583 (6sym) | 6sym x 4 | 33.285 | 102.82 | 136.105 |
| 5sub-1 | 617 | 617 | 583 (6sym) | 583 (6sym) | 583 (6sym) | 583 (6sym) | 583 (6sym) | 6sym x 5 | 67.285 | 102.82 | 170.105 |
| 6sub | 617 | 583 (6sym) | 583 (6sym) | 583 (6sym) | 583 (6sym) | 583 (6sym) | 679.77 (7sym) | 6sym x 4 + 7sym x 1 | -29.705 | 102.82 | 73.115 |
|  | 617 | 583 (6sym) | 583 (6sym) | 583 (6sym) | 583 (6sym) | 583 (6sym) | 679.77 (7sym) | 6sym x 5 + 7sym x 1 | 4.295 | 102.82 | 107.115 |

Fig. 12

| Base : 1/8Tu | SF0 | SF1 | SF2 | SF3 | SF4 | SF5 | SF6 | Extra Idle Time | Orignal IT | Total Idle Time |
|---|---|---|---|---|---|---|---|---|---|---|
|  | 6sym | 6sym | 6sym | 6sym | 6sym | 6sym | 5sym :Fixed |  |  |  |
| 1sub | 617 | 617 | 617 | 617 | 617 | 617 | 514.285 (5sym) | 34 | 102.82 | 136.82 |
| 2sub | 617 | 617 | 617 | 617 | 697.77 (7sym) | 583 (6sym) | 514.285 (5sym) | -28.77 | 102.82 | 74.05 |
| 2sub-1 | 617 | 617 | 617 | 617 | 583 (6sym) | 583 (6sym) | 514.285 (5sym) | 68 | 102.82 | 170.82 |
| 3sub | 617 | 617 | 617 | 697.77 (7sym) | 583 (6sym) | 583 (6sym) | 514.285 (5sym) | 5.23 | 102.82 | 108.05 |
| 4sub | 617 | 617 | 697.77 (7sym) | 583 (6sym) | 583 (6sym) | 583 (6sym) | 514.285 (5sym) | 39.23 | 102.82 | 142.05 |
| 5sub | 617 | 697.77 (7sym) | 583 (6sym) | 583 (6sym) | 583 (6sym) | 583 (6sym) | 514.285 (5sym) | 73.23 | 102.82 | 176.05 |
| 5sub-1 | 617 | 697.77 (7sym) | 697.77 (7sym) | 583 (6sym) | 583 (6sym) | 583 (6sym) | 514.285 (5sym) | -23.54 | 102.82 | 79.28 |

Fig. 13

| | | SF0(7) | SF1(6) | SF2(6) | SF3(6) | SF4(7) | SF5(6) | SF6(6) | SF7(7) | Extra Idle Time | Orignal IT | Total Idle Time | Total IT -97.11 |
|---|---|---|---|---|---|---|---|---|---|---|---|---|---|
| Method 1 | 1sub | 679.77 (7sym) | 583 | 583 | 583 | 679.77 | 583 | 583 | 679.77 | | 45.69 | | |
| Method 2 | 1sub :last 7sym | 679.77 (7sym) | 583 | 583 | 583 | 679.77 (7sym) | 583 | 583 | 617 (6sym) | 62.77 | 45.69 | 108.46 | 11.35 |
| Method 2 | 1sub :last 7sym | 679.77 (7sym) | 583 | 583 | 583 | 583 | 583 | 583 | 719.999 (7sym) | 56.881 | 45.69 | 102.571 | 5.461 |
| Method 1 | 2sub | 679.77 (7sym) | 583 | 583 | 583 | 679.77 (7sym) | 583 | 583 | 719.999 (7sym) | -40.229 | 45.69 | 5.461 | |
| Method 2 | 2sub :last 7sym | 679.77 (7sym) | 583 | 583 | 583 | 679.77 (7sym) | 583 | 617 (6sym) | 617 (6sym) | 28.77 | 45.69 | 74.46 | |
| Method 1 | 3sub | 679.77 (7sym) | 583 | 583 | 583 | 583 | 583 | 617 (6sym) | 719.999 (7sym) | 22.541 | 45.69 | 68.231 | |
| Method 2 | 3sub :last 7sym | 679.77 (7sym) | 583 | 583 | 583 | 679.77 (7sym) | 617 (6sym) | 617 (6sym) | 617 (6sym) | -5.23 | 45.69 | 40.46 | |
| Method 1 | 4sub | 679.77 (7sym) | 583 | 583 | 583 | 583 | 617 (6sym) | 617 (6sym) | 719.999 (7sym) | -11.45 | 45.69 | 34.24 | 6.12 |
| Method 2 | 4sub :last 7sym | 679.77 (7sym) | 583 | 583 | 679.77 (7sym) | 617 (6sym) | 617 (6sym) | 617 (6sym) | 617 (6sym) | 57.54 | 45.69 | 103.23 | |
| Method 1 | 4sub-1 | 679.77 (7sym) | 583 | 583 | 583 | 617 (6sym) | 617 (6sym) | 617 (6sym) | 514.285 (5sym) | -45.45 | 45.69 | 0.24 | |
| Method 1 | 4sub-1 | 679.77 (7sym) | 583 | 583 | 679.77 (7sym) | 617 (6sym) | 617 (6sym) | 617 (6sym) | 617 (6sym) | 63.485 | 45.69 | 109.175 | 12.065 |
| Method 1 | 5sub | 679.77 (7sym) | 583 | 583 | 617 (6sym) | 617 (6sym) | 617 (6sym) | 617 (6sym) | 617 (6sym) | -39.23 | 45.69 | 6.46 | |
| Method 1 | 5sub-1 | 679.77 (7sym) | 583 | 679.77 (7sym) | 617 (6sym) | 617 (6sym) | 617 (6sym) | 617 (6sym) | 514.285 (5sym) | 23.54 | 45.69 | 69.23 | |
| Method 1 | 6sub | 679.77 (7sym) | 583 | 617 (6sym) | 617 (6sym) | 617 (6sym) | 617 (6sym) | 617 (6sym) | 617 (6sym) | 29.485 | 45.69 | 75.175 | 40.835 |
| | | 583 | 583 | 617 (6sym) | 617 (6sym) | 617 (6sym) | 617 (6sym) | 617 (6sym) | 514.285 (5sym) | -10.46 | 45.69 | 35.23 | |
| Method 1 | 6sub-1 | 679.77 (7sym) | 583 | 617 (6sym) | 617 (6sym) | 617 (6sym) | 617 (6sym) | 617 (6sym) | 617 (6sym) | 86.31 | 45.69 | 132 | |
| Method 1 | 6sub-1 | 679.77 (7sym) | 617 (6sym) | 617 (6sym) | 617 (6sym) | 617 (6sym) | 617 (6sym) | 617 (6sym) | 617 (6sym) | 92.255 | 45.69 | 137.945 | |
| Method 1 | 6sub-2 | 679.77 (7sym) | 617 (6sym) | 617 (6sym) | 617 (6sym) | 617 (6sym) | 617 (6sym) | 617 (6sym) | 514.285 (5sym) | -4.515 | 45.69 | 41.175 | |
| Method 1 | 7sub | 679.77 (7sym) | 617 (6sym) | 617 (6sym) | 617 (6sym) | 617 (6sym) | 617 (6sym) | 617 (6sym) | 617 (6sym) | -44.46 | 45.69 | 1.23 | |
| | | 583 | 617 (6sym) | 617 (6sym) | 617 (6sym) | 617 (6sym) | 617 (6sym) | 617 (6sym) | 617 (6sym) | 52.31 | 45.69 | 98 | |
| Method 1 | 7sub-1 | 679.77 (7sym) | 617 (6sym) | 617 (6sym) | 617 (6sym) | 617 (6sym) | 617 (6sym) | 617 (6sym) | 514.285 (5sym) | 58.255 | 45.69 | 103.945 | 6.835 |

Fig. 14

| | SF0(7) | SF1(6) | SF2(6) | SF3(6) | SF4(7) | SF5(6) | SF6(6) | SF7(7) | Extra Idle Time | Orignal IT | Total Idle Time | Total IT |
|---|---|---|---|---|---|---|---|---|---|---|---|---|
| 1sub | 699.77 (7sym) | 699.77 (7sym) | 699.77 (7sym) | 583 | 583 | 583 | 583 | 583 | | | | -97.11 |
| 1sub-1 | 699.77 (7sym) | 699.77 (7sym) | 699.77 (7sym) | 583 | 583 | 583 | 583 | 514.285 (5sym) | 68.715 | 45.69 | 114.405 | 17.295 |
| 2sub | 699.77 (7sym) | 699.77 (7sym) | 699.77 (7sym) | 583 | 583 | 583 | 583 | 617 (6sym) | -34 | 45.69 | 11.69 | |
| 3sub | 699.77 (7sym) | 699.77 (7sym) | 699.77 (7sym) | 583 | 583 | 583 | 617 (6sym) | 514.285 (5sym) | 34.715 | 45.69 | 80.405 | |
| 4sub | 699.77 (7sym) | 699.77 (7sym) | 699.77 (7sym) | 583 | 583 | 617 (6sym) | 617 (6sym) | 514.285 (5sym) | 0.715 | 45.69 | 46.405 | |
| 4sub-1 | 699.77 (7sym) | 699.77 (7sym) | 699.77 (7sym) | 583 | 617 (6sym) | 617 (6sym) | 617 (6sym) | 514.285 (5sym) | -33.285 | 45.69 | 12.405 | |
| 5sub | 699.77 (7sym) | 699.77 (7sym) | 699.77 (7sym) | 583 | 617 (6sym) | 617 (6sym) | 514.285 (5sym) | 514.285 (5sym) | 69.43 | 45.69 | 115.12 | 212.23 |
| | 699.77 (7sym) | 699.77 (7sym) | 699.77 (7sym) | 617 (6sym) | 617 (6sym) | 617 (6sym) | 514.285 (5sym) | 514.285 (5sym) | 35.43 | 45.69 | 81.12 | |

Fig. 15

| | SF0 | SF1 | SF2 | SF3 | SF4 | SF5 | SF6 | SF7 | | Extra Idle Time | Orignal IT | Total Idle Time |
|---|---|---|---|---|---|---|---|---|---|---|---|---|
| | 6sym | 6sym | 6sym | 6sym | 6sym | 6sym | 6sym | 6sym | | | | |
| 1sub | 617 | 617 | 617 | 617 | 617 | 617 | 617 | 617 | | | | |
| 2sub | 617 | 617 | 617 | 617 | 617 | 617 | 617 | 582.66 | 6sym | 34.34 | 62.86 | 97.2 |
| 2sub-1 | 617 | 617 | 617 | 617 | 617 | 617 | 583 (6sym) | 583 (6sym) | 6sym x 2 | 68 | 62.86 | 130.86 |
| 3sub | 617 | 617 | 617 | 617 | 617 | 617 | 583 (6sym) | 679.77 (7sym) | 6sym x 1 + 7symbol x 1 | -28.99 | 62.86 | 33.87 |
| 4sub | 617 | 617 | 617 | 617 | 617 | 583 (6sym) | 583 (6sym) | 679.77 (7sym) | 6sym x 2 + 7symbol x 1 | 5.23 | 62.86 | 68.09 |
| 4sub-1 | 617 | 617 | 617 | 617 | 617 | 583 (6sym) | 679.77 (7sym) | 679.77 (7sym) | 6sym x 3 + 7symbol x 1 | 39.23 | 62.86 | 102.09 |
| 5sub | 617 | 617 | 617 | 617 | 583 (6sym) | 583 (6sym) | 679.77 (7sym) | 679.77 (7sym) | 6sym x 2 + 7symbol x 2 | -57.54 | 62.86 | 5.32 |
| 6sub | 617 | 617 | 617 | 583 (6sym) | 583 (6sym) | 583 (6sym) | 679.77 (7sym) | 679.77 (7sym) | 6sym x 3 + 7symbol x 2 | -23.54 | 62.86 | 39.32 |
| 6sub | 617 | 617 | 617 | 583 (6sym) | 583 (6sym) | 679.77 (7sym) | 679.77 (7sym) | 679.77 (7sym) | 6sym x 4 + 7symbol x 2 | 10.46 | 62.86 | 73.32 |
| 7sub | 617 | 583 (6sym) | 583 (6sym) | 583 (6sym) | 583 (6sym) | 679.77 (7sym) | 679.77 (7sym) | 679.77 (7sym) | 6sym x 5 + 7symbol x 2 | 44.46 | 62.86 | 107.32 |
| 7sub-1 | 617 | 583 (6sym) | 583 (6sym) | 583 (6sym) | 679.77 (7sym) | 679.77 (7sym) | 679.77 (7sym) | 679.77 (7sym) | 6sym x 4 + 7symbol x 3 | -52.31 | 62.86 | 10.55 |

METHOD OF CONSTRUCTING A FRAME BY MULTIPLEXING SUBFRAMES HAVING DIFFERENT CP LENGTH

CROSS-REFERENCE TO RELATED APPLICATIONS

This application is the National Stage filing under 35 U.S.C. 371 of International Application No. PCT/KR2009/004764, filed on Aug. 26, 2009, which claims the benefit of earlier filing date and right of priority to Korean Application No. 10-2009-0065822 filed on Jul. 20, 2009, and also claims the benefit of U.S. Provisional Application Ser. No. 61/092,737, filed on Aug. 28, 2008, the contents of which are all incorporated by reference herein in their entirety.

TECHNICAL FIELD

The present invention relates to a broadband wireless access system, and more particularly, to a frame structure to which OFDM symbols are transmitted.

BACKGROUND ART

The basic principle of orthogonal frequency division multiplexing (OFDM), which is a multi-carrier modulation scheme, in a wireless communication system will be described as follows.

In the OFDM scheme, a data stream having a high rate is divided into a large number of data streams having a slow rate and the data streams are simultaneously transmitted using a plurality of carriers. Each of the plurality of carriers is called a sub-carrier.

Since orthogonality exists among the subcarriers, the subcarriers can be detected by a receiving end even in the case that frequency components of the subcarriers overlap with each other. The data stream having the high rate is converted into a plurality of data streams having the slow rate by a serial-to-parallel converter, each of the plurality of data streams converted in parallel is multiplied by each of the subcarriers, the data streams are added to one another, and the added data streams are transmitted to the receiving side.

The plurality of parallel data streams generated by the serial-to-parallel converter can be transmitted by the plurality of sub-carriers using an Inverse Discrete Fourier Transform (IDFT). In this case, the IDFT can be efficiently implemented using an Inverse Fast Fourier Transform (IFFT). Since a symbol duration of each of the subcarriers having the slow rate is increased, a relative signal dispersion on a time axis, which is generated by multi-path delay spread, is decreased.

In the wireless communication using such an OFDM scheme, inter-symbol interference can be reduced in such a manner that a guard interval longer than delay spread of a channel is inserted between OFDM symbols.

In other words, while each symbol is being transmitted through a multi path channel, a guard interval longer than maximum delay spread of a channel is inserted between continuous symbols. At this time, to prevent inter-subcarrier orthogonality from being violated, a signal of the last interval (i.e., guard interval) of an effective symbol interval is copied and attached at a start part of a symbol. This will be referred to as cyclic prefix (CP). The cyclic prefix will be described with reference to FIG. 1.

FIG. 1 is a diagram illustrating an example of a symbol structure which includes a cyclic prefix.

Referring to FIG. 1, a symbol period (Ts) becomes a sum of an effective symbol interval (Tb) and a guard interval (Tg). A receiving end performs demodulation by selecting data corresponding to the effective symbol interval after removing the guard interval. A transmitting side end the receiving end can be synchronized with each other using a cyclic prefix, and can maintain orthogonality between data symbols.

In the wireless communication system to which the OFDM scheme is applied, CPs of different lengths can be used depending on environment to which each cell belongs or properties of data transmitted within the cell. For example, a long CP is used in a cell operated under wireless channel environment where delay spread is great while a short CP is used in a cell operated under wireless channel environment where delay spread is small. For another example, within one cell, data which requires high receiving performance is transmitted using a long CP while data which requires relatively low receiving performance is transmitted using a short CP.

In this way, if CPs of different lengths are transmitted through one transmission unit, for example, one frame, more efficient communication can be performed.

DISCLOSURE OF INVENTION

Technical Problem

Accordingly, the present invention has been devised to obviate one or more problems due to limitations and disadvantages of the related art, and an object of the present invention is to provide a method of constructing an efficient frame using symbols having different cyclic prefix lengths in a wireless communication system.

Another object of the present invention is to provide a method of constructing an optimized frame using symbols having different cyclic prefix lengths.

It is to be understood that technical problems to be solved by the present invention are not limited to the aforementioned technical problems and other technical problems which are not mentioned will be apparent from the following description to the person with an ordinary skill in the art to which the present invention pertains.

Technical Solution

To achieve the objects of the present invention, a method of constructing a frame in a broadband wireless access system according to one embodiment of the present invention comprises including one or more first subframes in the frame, the first subframes including a plurality of symbols having a cyclic prefix of a first length; and including one or more second subframes in the frame, the second subframes including a plurality of symbols having a cyclic prefix of a second length different from the first length, wherein the number of the first subframes and the number of the second subframes are determined considering an idle time for which effective symbols are not transmitted from the frame.

In this case, the frame is constructed by a time division duplexing (TDD) mode.

Also, the frame is divided into an uplink subframe region and a downlink subframe region, each of which includes a predetermined number of subframes.

Also, the one or more second subframes are located in the downlink subframe region.

Also, the one or more second subframes are located from the last part of the downlink subframe region.

Also, the uplink subframe region includes N (N=<7, N is a natural number) number of subframes, and the downlink subframe region includes (8−N) number of subframes.

Also, the N is 3, and the number of the second subframes is 3.

Also, one of the three second subframes includes five symbols having the cyclic prefix of the second length, and the other second subframes include six symbols having the cyclic prefix of the second length.

Also, the idle time includes a first idle time and a second idle time, the first idle time being located between the downlink subframe region and the uplink subframe region, and the second idle time being located behind the uplink subframe region.

Also, the number of the one or more first subframes and the number of the one or more second subframes are determined to fix the second idle time to a predetermined value and minimize the first idle time.

In another aspect of the present invention, the frame is constructed by a frequency division duplexing (FDD) mode.

In this case, the number of the one or more first subframes is M (M=<7, M is a natural number), and the number of the one or more second subframes is (8−M).

Also, the one or more second subframes are located behind the frame.

Also, the M is 5, and each of the one or more second subframes includes six symbols having the cyclic prefix of the second length.

In the embodiments of the present invention, the first length corresponds to $1/16$ of an effective interval length of one of the plurality of symbols, and the second length corresponds to $1/8$ of the effective interval length.

Also, the one or more first subframes include unicast data, and the one or more second subframes include multicast or broadcast data.

Advantageous Effects

According to the embodiments of the present invention, the following advantages can be obtained.

First of all, radio resources can be used efficiently through the method of constructing a frame using symbols having different cyclic prefix lengths in accordance with the embodiments of the present invention.

Second, radio resources can be used efficiently through the method of constructing an optimized frame using a symbol having different cyclic prefix lengths in accordance with the embodiments of the present invention.

It is to be understood that the advantages that can be obtained by the present invention are not limited to the aforementioned advantages and other advantages which are not mentioned will be apparent from the following description to the person with an ordinary skill in the art to which the present invention pertains.

BRIEF DESCRIPTION OF DRAWINGS

The accompanying drawings, which are included to provide a further understanding of the invention, illustrate embodiments of the invention and together with the description serve to explain the principle of the invention.

In the drawings:

FIG. 6 is a diagram illustrating an example of idle time variation according to a ratio of subframes having different cyclic prefix (CP) lengths in accordance with one embodiment of the present invention;

FIG. 7 is a diagram illustrating another example of idle time variation according to a ratio of subframes having different cyclic prefix (CP) lengths in accordance with one embodiment of the present invention;

FIG. 8 is a diagram illustrating another example of idle time variation according to a ratio of subframes having different cyclic prefix (CP) lengths in accordance with one embodiment of the present invention;

FIG. 9 is a diagram illustrating another example of idle time variation according to a ratio of subframes having different cyclic prefix (CP) lengths in accordance with one embodiment of the present invention;

FIG. 10 is a diagram illustrating another example of idle time variation according to a ratio of subframes having different cyclic prefix (CP) lengths in accordance with one embodiment of the present invention;

FIG. 11 is a diagram illustrating another example of idle time variation according to a ratio of subframes having different cyclic prefix (CP) lengths in accordance with one embodiment of the present invention;

FIG. 12 is a diagram illustrating another example of idle time variation according to a ratio of subframes having different cyclic prefix (CP) lengths in accordance with one embodiment of the present invention;

FIG. 13 is a diagram illustrating another example of idle time variation according to a ratio of subframes having different cyclic prefix (CP) lengths in accordance with one embodiment of the present invention;

FIG. 14 is a diagram illustrating another example of idle time variation according to a ratio of subframes having different cyclic prefix (CP) lengths in accordance with one embodiment of the present invention; and FIG. 15 is a diagram illustrating another example of idle time variation according to a ratio of subframes having different cyclic prefix (CP) lengths in accordance with one embodiment of the present invention.

MODE FOR THE INVENTION

Figure 1:
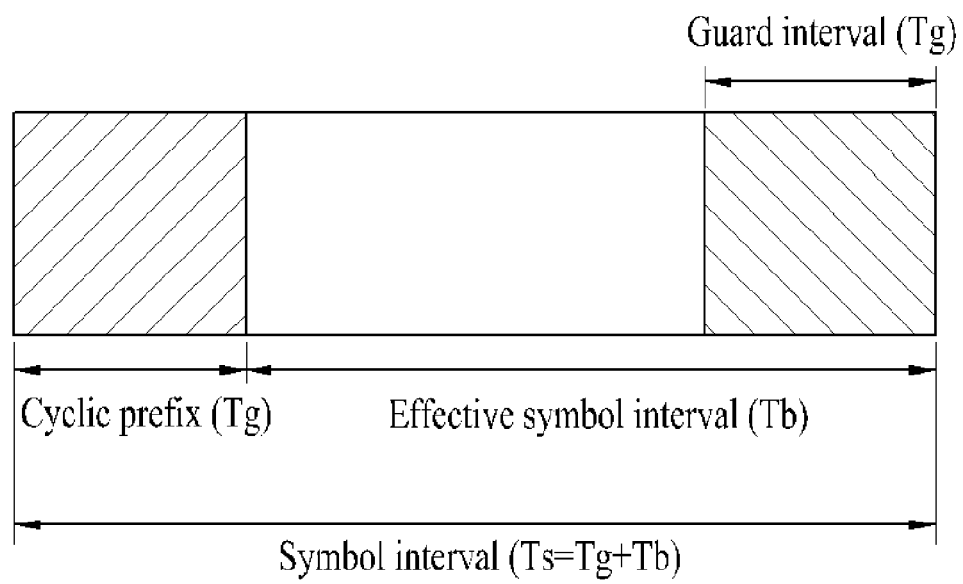
FIG. 1 is a diagram illustrating an example of a symbol structure which includes a cyclic prefix.

Reference will now be made in detail to the preferred embodiments of the present invention, examples of which are illustrated in the accompanying drawings. The present invention discloses a method of constructing a frame by multiplexing subframes including symbols having different cyclic prefix lengths. The following embodiments are achieved by combination of structural elements and features of the present invention in a predetermined type. Each of the structural elements or features should be considered selectively unless specified separately.

Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

In the description of the drawings, procedures or steps that may make the subject matter of the present invention obscure will not be described, and procedures or steps that can be understood by the person with ordinary skill in the art will not be described.

The embodiments of the present invention have been described based on the data transmission and reception between a base station and a mobile station. In this case, the base station means a terminal node of a network that performs direct communication with the mobile station. A specific operation which has been described as being performed by the base station may be performed by an upper node of the base station as the case may be.

In other words, it will be apparent that various operations performed for communication with the mobile station in the network which includes a plurality of network nodes along with the base station can be performed by the base station or network nodes other than the base station. The base station may be replaced with terms such as a fixed station, Node B, eNode B (eNB), and access point. Also, the mobile station may be replaced with terms such as a user equipment (UE), a subscriber station (SS), a mobile subscriber station (MSS), a mobile terminal and a terminal.

Furthermore, a transmitting side means a fixed and/or mobile node that provides data services or voice services while a receiving side means a fixed and/or mobile node that receives data services or voice services. Accordingly, in an uplink, the mobile station could be a transmitting side while the base station could be a receiving side. Likewise, in a downlink, the mobile station could be a receiving side while the base station could be a transmitting side.

Meanwhile, in the present invention, examples of the mobile station include a personal digital assistant (PDA), a cellular phone, a personal communication service (PCS) phone, a global system for mobile (GSM) phone, a wideband CDMA (WCDMA) phone, and a mobile broadband system (MBS) phone. Moreover, examples of the mobile station include a personal digital assistant (PDA), a hand-held PC, a notebook PC, a smart phone, and a multimode-multiband (MM-MB) terminal.

In this case, the smart phone is a terminal provided with advantages of a mobile communication terminal and a PDA. The smart phone may mean a terminal in which a schedule management function of a PDA and data communication functions of facsimile transmission/reception, internet access, etc. are integrated on a mobile communication terminal. And, the multimode-multiband terminal means a terminal having a built-in multi-MODEM chip to be operable in a portable internet system and other mobile communication systems (e.g., CDMA (code division multiple access) 2000 system, WCDMA (wideband CDMA) system, etc.).

The embodiments according to the present invention can be implemented by various means, for example, hardware, firmware, software, or their combination. If the embodiment according to the present invention is implemented by hardware, the random access method in the wireless communication system according to the embodiment of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the method of processing data in a wireless communication system according to the embodiment of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

The embodiments of the present invention can be supported by standard documents disclosed in at least one of wireless access systems, i.e., IEEE 802 system, 3GPP system, 3GPP LTE system, and 3GPP2 system. Namely, among the embodiments of the present invention, steps or parts which are not described to clarify technical spirits of the present invention can be supported by the above standard documents. Also, all terminologies disclosed herein can be described by the above standard documents. Particularly, the embodiments of the present invention can be supported by one or more of standard documents of the IEEE 802.16 system, i.e., P802.16-2004, P802.16e-2005 and P802.16Rev2.

Hereinafter, the preferred embodiments according to the present invention will be described in detail with reference to the accompanying drawings. It is to be understood that the detailed description which will be disclosed together with the accompanying drawings is intended to describe exemplary embodiments of the present invention and is not intended to describe unique embodiments by which the present invention can be carried.

Specific terminologies hereinafter described are provided to assist understanding of the present invention, and various modifications can be made in the specific terminologies within the range that they do not depart from technical spirits of the present invention.

Figure 2:
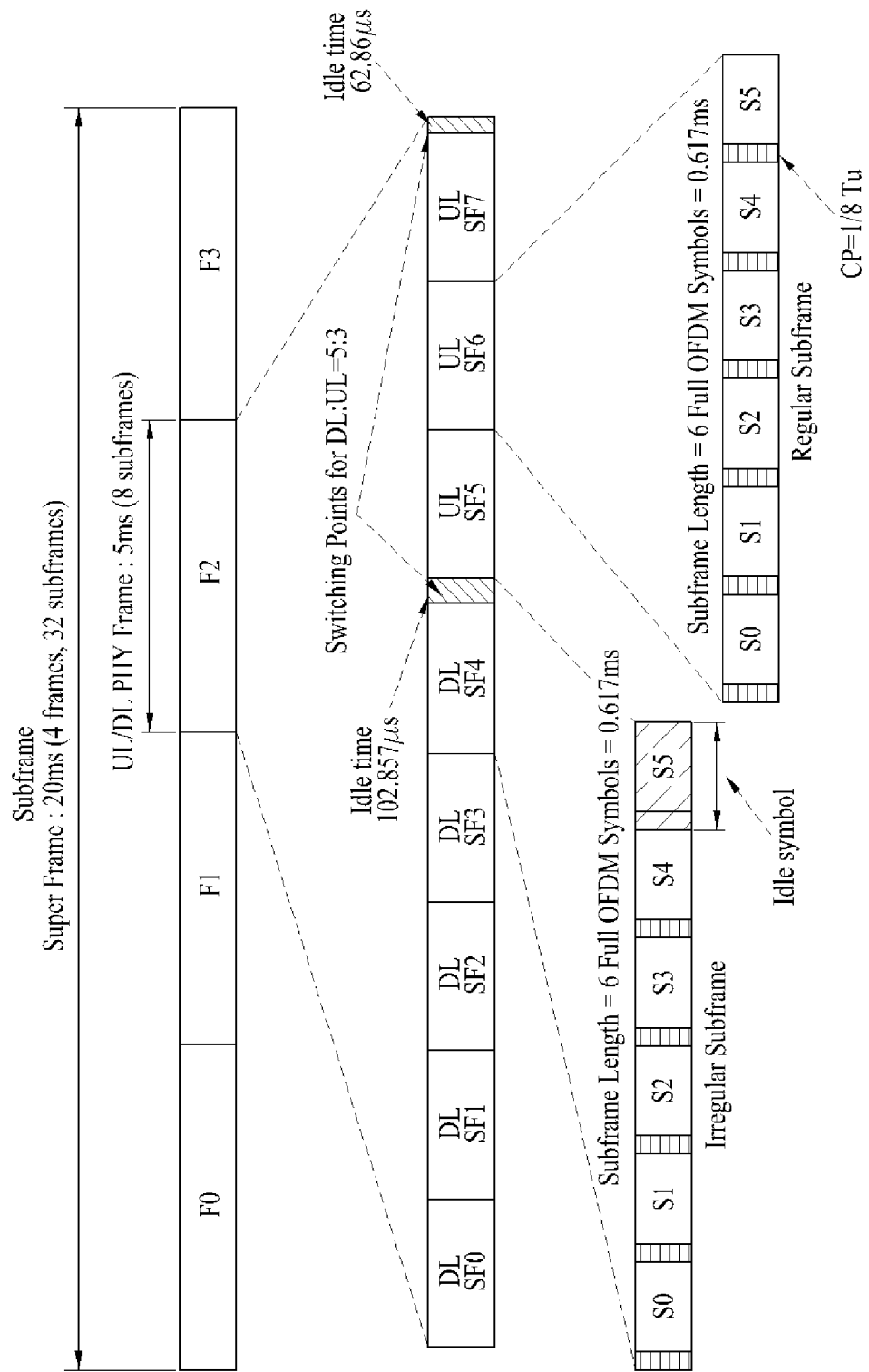
FIG. 2 is a diagram illustrating an example of a time division duplexing (TDD) physical frame structure having a cyclic prefix (CP) length corresponding to $1/8$ of an effective length of a data symbol in a wireless MAN mobile communication system based on IEEE 802.16 system.

FIG. 2 is a diagram illustrating an example of a time division duplexing (TDD) physical frame structure having a cyclic prefix (CP) length corresponding to ⅛ of an effective symbol interval of a data symbol in a wireless MAN mobile communication system based on IEEE 802.16 system.

Referring to FIG. 2, a superframe has a length of 20 ms and includes four frames.

One frame includes eight subframes that can be divided into a downlink subframe region and an uplink subframe region depending on a downlink to uplink ratio (DL/UL ratio), wherein each of the downlink subframe region and the uplink subframe region includes a predetermined number of subframes. As illustrated in FIG. 2, when the UL/DL ratio is 5:3, five of eight subframes are allocated to downlink subframes SF0 to SF4 and the other three subframes are allocated to uplink subframes SF5 to SF7. An idle time, i.e., transmit/receive transition gap (TTG) for which data symbols (i.e., idle symbols) including data are not allocated exists between the downlink subframe region and the uplink subframe region. Also, an idle time, i.e., receive/transmit transition gap (RTG) exists behind the downlink subframe region.

One subframe includes six OFDM symbols. Each OFDM symbol has a CP length corresponding to ⅛ of its effective symbol interval. Exceptionally, like the last subframe SF4 of the downlink, a subframe that includes five data symbols and one idle symbol may exist. In this case, one idle symbol is allocated to the RTG.

Figure 3:
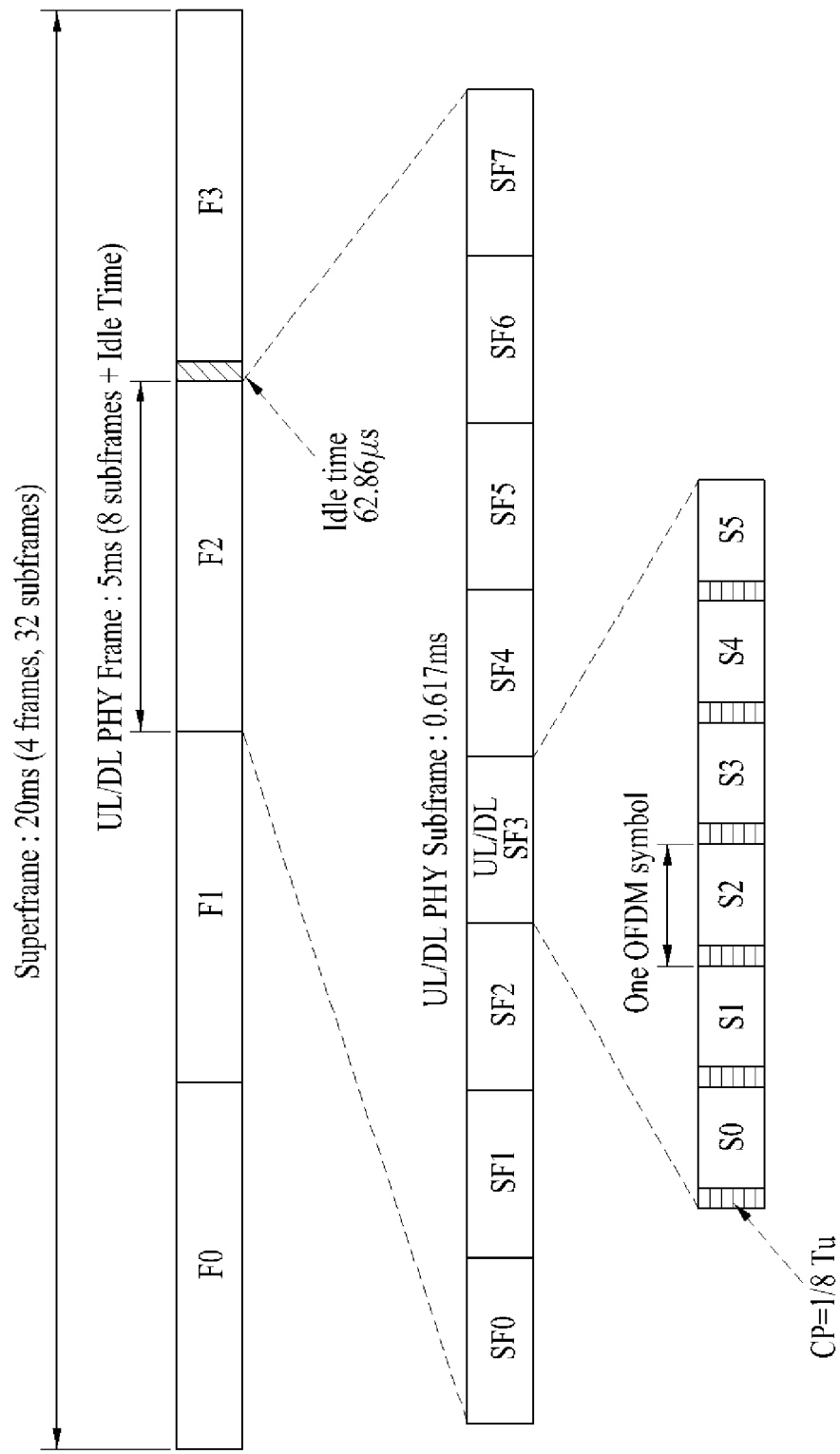
FIG. 3 is a diagram illustrating an example of a frequency division duplexing (FDD) physical frame structure having a cyclic prefix (CP) length corresponding to $1/8$ of an effective length of a data symbol in a wireless MAN mobile communication system based on IEEE 802.16 system.

FIG. 3 is a diagram illustrating an example of a frequency division duplexing (FDD) physical frame structure having a cyclic prefix (CP) length corresponding to ⅛ of an effective symbol interval of a data symbol in a wireless MAN mobile communication system based on IEEE 802.16 system.

Unlike the structure of FIG. 2 where the downlink and the uplink are divided from each other by a time division mode of a subframe unit, in the structure of FIG. 3, the downlink and the uplink are divided from each other by a frequency division mode. In this case, a superframe includes four frames, each of which includes eight subframes. However, since the downlink and the uplink are divided from each other by frequency as described above, they are not divided into the uplink subframe region and the downlink subframe region. Accordingly, no idle time (i.e., RTG) exists between the downlink subframe region and the uplink subframe region, and both the uplink and the downlink exist in one subframe. One subframe includes six OFDM symbols. Each OFDM symbol has a CP length corresponding to ⅛ of its effective symbol interval.

Figure 4:
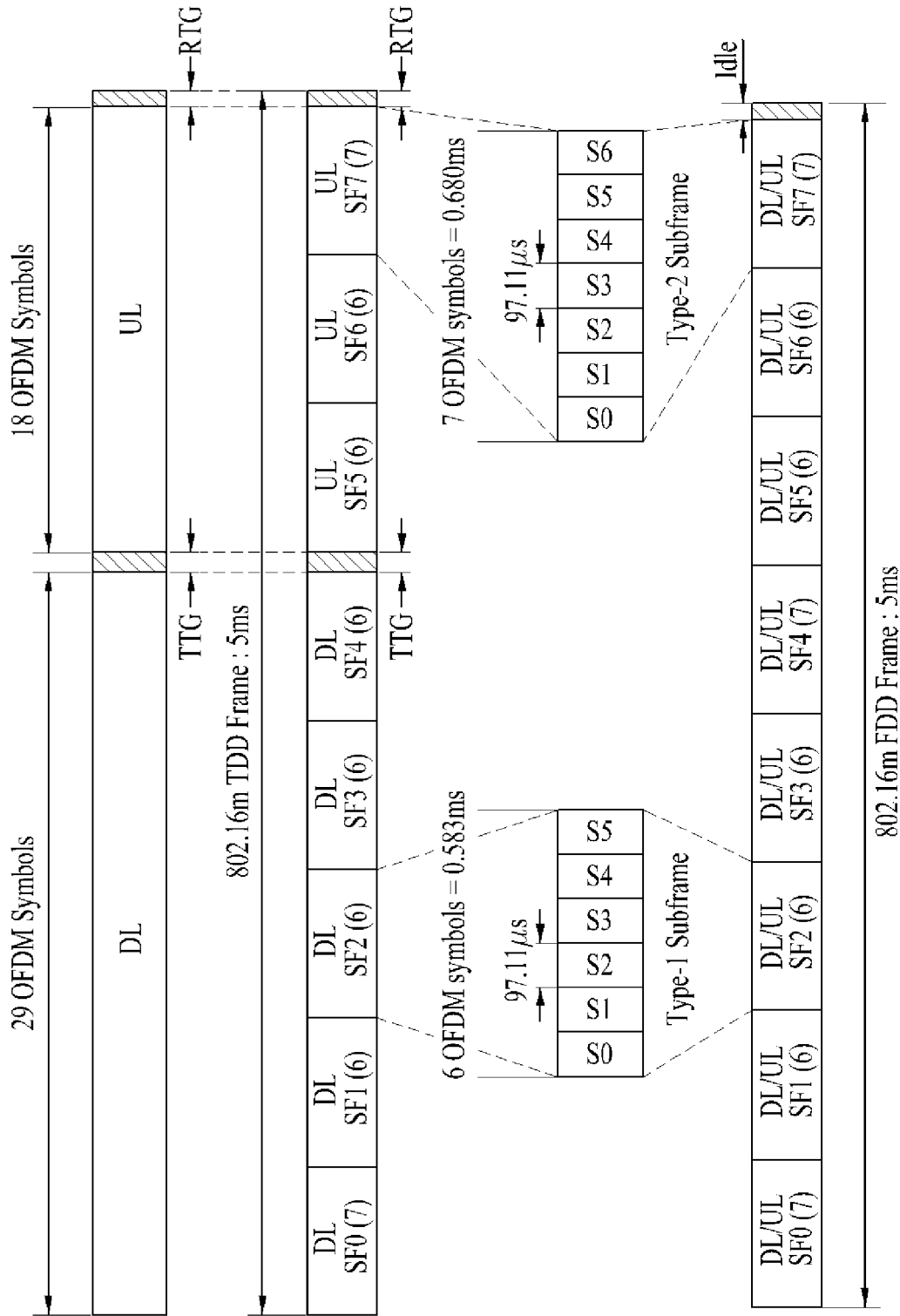
FIG. 4 is a diagram illustrating an example of a physical frame structure having a cyclic prefix (CP) length corresponding to $1/16$ of an effective length of a data symbol in a wireless MAN mobile communication system based on IEEE 802.16 system.

FIG. 4 is a diagram illustrating an example of a physical frame structure having a cyclic prefix (CP) length corresponding to 1/16 of an effective symbol interval of a data symbol in a wireless MAN mobile communication system based on IEEE 802.16 system.

Referring to FIG. 4, unlike the frame structure illustrated in FIG. 2 or FIG. 3, as a CP length becomes short, each of the first subframe SF0, the fifth subframe SF4 and the last subframe SF7 includes seven OFDM symbols in the cases where frequency division is used (FDD) and time division is used (TDD). This is because that the time for more OFDM symbols can be obtained in superframes of the same length as the CP length becomes short. However, in case of the time division duplexing (TDD) mode, as one idle OFDM symbol is allocated to the RTG, the fifth subframe include six effective symbols.

Although one kind of CP has been used in the aforementioned frame structure, the present invention suggests a frame structure having two or more different CP lengths for more efficient communication.

Figure 5:
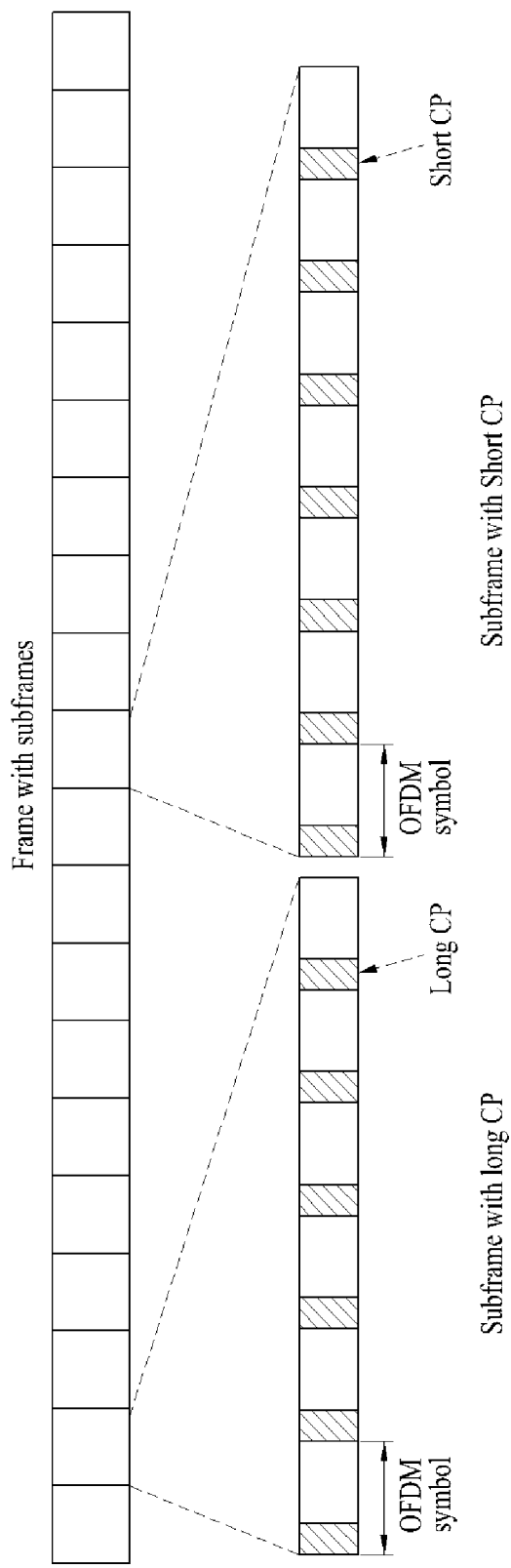
FIG. 5 is a diagram illustrating an example of a frame structure having different cyclic prefix (CP) lengths in accordance with the present invention.

FIG. 5 is a diagram illustrating an example of a frame structure having different cyclic prefix (CP) lengths in accordance with the present invention.

Generally, when a downlink transmission unit of a broadband wireless access system is divided into superframe, frame, subframe, and OFDM symbol on a time axis, a plurality of OFDM symbols constitute one subframe as illustrated in FIG. 5.

In this case, it is assumed that different CP lengths are applied to each subframe. As illustrated in FIG. 5, the number of OFDM symbols within a subframe to which a long CP is applied becomes smaller than that of OFDM symbols within a subframe to which a short CP is applied. The left subframe of FIG. 5 includes six OFDM symbols having a long CP, and the right subframe includes seven OFDM symbols having a short CP.

As described above, if OFDM symbols having different CP lengths coexist within one frame in a unit of subframe, there is difference in the number of effective data symbols depending on the CP length. For this reason, there is difference in a method of constructing symbols in a unit of subframe. Also, in case of the TDD mode, even though the CP length is not changed, there may be difference in the number of effective symbols depending on the DL/UL ratio.

Considering the aforementioned matters, the present invention suggests a frame structure having an optimized idle time as well as a frame structure where OFDM symbols having different CP lengths coexist in a unit of subframe. This frame structure is useful for combination of unicast symbols having a short CP length and multicast broadcast service (MBS) symbols having a long CP length.

The idle time existing within one frame occurs twice in the TDD mode and once in the FDD mode. The embodiments of the present invention hereinafter described are based on a method of considering a frame structure by fixing the idle time (i.e., TTG) located behind the uplink subframe in the TDD mode. In this case, if the number of uplink subframes is equally provided, a start point of the uplink subframe region is unchanged and the idle time (i.e., RTG) behind the downlink subframe region may only be changed.

However, the present invention is not limited to the above case, and may be applied to the case where the total idle time (i.e., the sum of TTG and RTG) is varied for a specific object. Also, in the embodiments of the present invention, it is assumed that one frame includes eight subframes. It is also assumed that a subframe having a basic CP structure and another CP structure is located in a downlink subframe region in one frame, and an uplink subframe has a basic CP structure of a corresponding frame.

Hereinafter, a CP length corresponding to an effective symbol interval length of OFDM symbol will be referred to as "Tu". For example, a CP length corresponding to 1/16 of an effective symbol interval is marked with "1/16Tu". Also, a CP having a length of 1/16Tu length is marked with "1/16 CP".

1. TDD: Combination of 1/16CP(Base) and ⅛CP, Case where the Number of 1/16CP OFDM Symbols of the First Subframe is Fixed to 7.

According to the embodiment of the present invention, there is provided a method of constructing a frame by time division duplexing subframes comprised of OFDM symbols having a CP length of ⅛Tu in a basic subframe structure comprised of OFDM symbols having a CP length of 1/16Tu. This method will be described with reference to FIG. 6.

FIG. 6 is a diagram illustrating an example of idle time variation according to a ratio of subframes having different cyclic prefix (CP) lengths in accordance with one embodiment of the present invention.

In FIG. 6, a basic subframe structure includes OFDM symbols having a CP length of 1/16Tu. In this case, the first subframe basically includes seven OFDM symbols. Also, each value has a unit of 10−6 seconds(us), and values within parentheses next to figures represent how many OFDM symbols are included in the corresponding subframe. As described above, in the TDD mode, RTG is not changed and the original idle time (IT) represents a value of TTG.

Moreover, it is assumed that subframes including OFDM symbols having a CP length of ⅛Tu are filled in the frame in the order of subframe (SF7) located at the last part of the downlink subframe region, and the subframes within the frame are all downlink subframes (i.e., DL/UL ratio=8:0). If the subframes having another CP length different from the basic CP length are located from the last part of the downlink subframe region, signaling overhead for indicating the location of the subframe having another CP structure to the receiving end within the frame can be more reduced than the case where the subframes are located at the middle stage. When the receiving end knows the DL/UL subframe ratio, the transmitting side has to only indicate a start point of the subframe having another CP structure to the receiving end. The transmitting end can include the start point of the subframe having another CP structure in a super frame header (SFH).

Referring to FIG. 6, the subframes comprised of OFDM symbols having a CP length of CP=⅛Tu can be multiplexed in one frame from one subframe to maximum seven subframes. At this time, the subframe of a CP=⅛Tu structure basically includes six OFDM symbols but may include five OFDM symbols. If two or more subframes of a CP=⅛Tu structure are included in one frame, the subframe having six ⅛CP OFDM symbols and the subframe having five ⅛CP OFDM symbols can simultaneously exist in one frame.

617 us and 514.255 us mean the time corresponding to the subframe interval including six OFDM symbols of a CP=⅛Tu structure and the time corresponding to the subframe interval including five OFDM symbols of a CP=⅛Tu structure, respectively. However, the values 617 us and 514.255 us are only exemplary, and can be changed depending on the system status or user requirements. If the time corresponding to one subframe interval is changed, one subframe is preferably constructed based on the number of symbols instead of time.

Consequently, when two subframes including six OFDM symbols having a CP=⅛Tu structure and one subframe including five OFDM symbols having a CP=⅛Tu structure are included in the frame, the least variation of the idle time occurs. In the second place, when six subframes including six OFDM symbols having a CP=⅛Tu structure included in the frame, less variation of the idle time occurs. Accordingly, if it is assumed that the original idle time is an optimized value in a general frame structure (i.e., the case where all subframes have a ¹⁄₁₆CP structure), it is regarded that the aforementioned two cases represent the most efficient frame structure.

FIG. 7 is a diagram illustrating another example of idle time variation according to a ratio of subframes having different cyclic prefix (CP) lengths in accordance with one embodiment of the present invention.

FIG. 7 is identical with FIG. 6 in view of basic settings but illustrates that the DL/UL ratio is 7:1. Accordingly, one or six subframes having a CP=⅛Tu structure can be included in one frame. In this case, it is noted that when three and six subframes having a CP=⅛Tu structure exist, the least variation of the idle time occurs.

Likewise, in case of the DL/UL ratio of 5:3, when two subframes including six OFDM symbols having a CP=⅛Tu structure and one subframe including five OFDM symbols having a CP=⅛Tu structure are included in the frame, the least variation of the idle time occurs.

2. TDD: Combination of ¹⁄₁₆CP(Base) and ⅛CP, Case where the Number of ¹⁄₁₆CP OFDM Symbols of the First Subframe is Fixed to 6.

Unlike the frame structure described with reference to FIG. 6 and FIG. 7, the case where the number of ¹⁄₁₆CP OFDM symbols of the first subframe of a frame is fixed to 6 not 7 will be described with reference to FIG. 8 and FIG. 9.

FIG. 8 is a diagram illustrating another example of idle time variation according to a ratio of subframes having different cyclic prefix (CP) lengths in accordance with one embodiment of the present invention.

In FIG. 8, all subframes are established in the downlink subframe region (DL/UL ratio=8:0). Since others except for the number of ¹⁄₁₆CP OFDM symbols included in the first subframe are identical with those of FIG. 6, their repeated description will be omitted.

In this case, when the number of subframes including six OFDM symbols of a ⅛CP structure is 4, the total idle time is the shortest. In the second place, when the number of subframes including six OFDM symbols of a ⅛CP structure is 5 and the number of subframes including five OFDM symbols of a ⅛CP structure is 1, the total idle time is the second shortest. Also, the total idle time is the most similar to that of the basic structure when the number of subframes of a ⅛CP structure is 6.

FIG. 9 is a diagram illustrating another example of idle time variation according to subframe having different cyclic prefix (CP) lengths in accordance with one embodiment of the present invention.

FIG. 9 is identical with FIG. 8 in view of basic settings but illustrates that the DL/UL ratio is 7:1. Accordingly, one or six subframes having a CP=⅛Tu structure can be included in one frame. In this case, like FIG. 8, it is noted that when the number of subframes including six OFDM symbols of ⅛CP structure is 4, the total idle time is the shortest and is the most similar to that of the basic structure when the number of subframes of a ⅛CP structure is 6.

Likewise, in case of the DL/UL ratio of 5:3, when the number of subframes including six OFDM symbols having a ⅛CP structure is 4, the total idle time is the shortest. However, the total idle time is the most similar to that of the basic structure when the number of subframes of a ⅛CP structure is 3.

In FIG. 8 and FIG. 9, among subframes having a ⅛CP structure, a ratio of subframes having five OFDM symbols is low as compared with FIG. 6 and FIG. 7. This is because that one OFDM symbol omitted from the first subframe in FIG. 8 and FIG. 9 is located in the subframe having five OFDM symbols in FIG. 6 and FIG. 7 to constitute the subframe having six OFDM symbols. In this case, as ¹⁄₁₆CP OFDM symbol is replaced with ⅛CP OFDM symbol, the idle time becomes short, whereby radio resources can be used more efficiently.

3. TDD: Combination of ⅛CP(Base) and ¹⁄₁₆CP, Case where the Number of ⅛CP OFDM Symbols of the First Subframe is Fixed to 6.

According to another embodiment of the present invention, there is provided a method of constructing a frame by time division duplexing subframes comprised of OFDM symbols having a CP length of ¹⁄₁₆Tu in a basic subframe structure comprised of OFDM symbols having a CP length of ⅛Tu. This method will be described with reference to FIG. 10.

FIG. 10 is a diagram illustrating an example of idle time variation according to a ratio of subframes having different cyclic prefix (CP) lengths in accordance with one embodiment of the present invention.

In FIG. 10, a basic subframe structure includes OFDM symbols having a CP length of ⅛Tu. In this case, the first subframe basically includes six OFDM symbols. Also, each value has a unit of 10−6 seconds(us), and values within parentheses next to figures represent how many OFDM symbols are included in the corresponding subframe. As described above, in the TDD mode, RTG is not changed and the original idle time (IT) represents a value (102.82 us) of TTG.

Moreover, it is assumed that subframes including OFDM symbols having a CP length of ⅛Tu are filled in the frame in the order of subframe (SF7) located at the last part of the downlink subframe region, and the subframes within the frame are all downlink subframes (i.e., DL/UL ratio=8:0).

Referring to FIG. 10, the subframes comprised of OFDM symbols having a CP length of CP=⅛Tu can be multiplexed in one frame from one subframe to maximum seven subframes. At this time, the subframe of a CP=¹⁄₁₆Tu structure basically includes six OFDM symbols but may include five or seven OFDM symbols. If two or more subframes of a CP=¹⁄₁₆Tu structure are included in one frame, the subframe having six ¹⁄₁₆CP OFDM symbols and the subframe having five or seven ¹⁄₁₆CP OFDM symbols can simultaneously exist in one frame.

In this case, the idle time can be controlled in such a manner that one of six ¹⁄₁₆CP OFDM symbols is added to or omitted from the subframe (SF7) of the last downlink subframe region. For example, it is assumed that the idle time shorter than the idle time of the basic structure (the whole frame includes ⅛CP OFDM symbols) is not allowed. In this case, in the same manner as that the number of ¹⁄₁₆CP subframes is 3 in FIG. 10, the number of OFDM symbols of the last subframe becomes 5, whereby the idle time is not shorter than that of the basic frame structure.

When the number of subframes including six OFDM symbols of a ¹⁄₁₆ structure is 2, the total idle time is the shortest. When the number of subframes of a ¹⁄₁₆ structure is 6, the total idle time is not shorter than the idle time of the basic frame structure and at the same time is the shortest. Also, the total idle time is the most similar to that of the basic structure when the number of subframes having six ¹⁄₁₆CP OFDM symbols is 3.

FIG. 11 is a diagram illustrating another example of idle time variation according to a ratio of subframes having different cyclic prefix (CP) lengths in accordance with one embodiment of the present invention.

FIG. 11 is identical with FIG. 10 in view of basic settings but illustrates that the DL/UL ratio is 7:1. Accordingly, one or six subframes having a CP=¹⁄₁₆Tu structure can be included in one frame. In this case, like FIG. 10, it is noted that when the number of subframes including six OFDM symbols of a ¹⁄₁₆CP structure is 2, the total idle time is the shortest. Also, the total idle time is, but not shorter than that of the basic frame structure, the shortest when the number of subframes of a ¹⁄₁₆CP structure is 6. Moreover, the total idle time is the most similar to that of the basic structure when the number of subframes of six ¹⁄₁₆CP OFDM symbols is 3.

Likewise, in case of the DL/UL ratio of 5:3, when the number of subframes including six OFDM symbols having a ¹⁄₁₆CP structure is 2, the total idle time is the shortest. However, the total idle time is the most similar to that of the basic structure when the number of subframes including six ¹⁄₁₆CP OFDM symbols is 3.

4. TDD: Combination of ⅛CP(Base) and ¹⁄₁₆CP, Case where the Number of ⅛CP OFDM Symbols of the Last Subframe of Downlink Subframe Region is Fixed to 5.

This embodiment is identical with the frame structure described with reference to FIG. 11 in view of basic settings. However, although the first subframe is fixed to six ⅛CP OFDM symbols in FIG. 11, the last subframe of the downlink subframe region is fixed to six ⅛CP OFDM symbols in this embodiment. If the last subframe is fixed, the frame can be constructed in such a manner that subframes of a ¹⁄₁₆CP structure are filled one by one in the order of a previous subframe of the last subframe. This will be described with reference to FIG. 12.

FIG. 12 is a diagram illustrating another example of idle time variation according to a ratio of subframes having different cyclic prefix (CP) lengths in accordance with another embodiment of the present invention.

In FIG. 12, the basic structure is identical with that of FIG. 11 as described above.

When the number of subframes including six OFDM symbols of a ¹⁄₁₆CP structure is 1 and the number of subframes including seven OFDM symbols of a ¹⁄₁₆CP structure is 1, the total idle time is the shortest. Also, the total idle time is the most similar to that of the basic structure when the number of subframes of a ¹⁄₁₆CP structure is 3.

Likewise, in case of the DL/UL ratio of 5:3, like FIG. 12 (DL:UL=7:1), when the number of subframes including six OFDM symbols having a ¹⁄₁₆CP structure is 1 and the number of subframes including seven OFDM symbols having a ¹⁄₁₆CP structure is 1, the total idle time is the shortest. Also, the total idle time is the most similar to that of the basic structure when the number of subframes of a ¹⁄₁₆CP structure is 3.

5. FDD: Combination of ¹⁄₁₆CP(Base) and ⅛CP

According to another embodiment of the present invention, there is provided a method of constructing a frame using subframes comprised of OFDM symbols having different lengths in a frequency division duplexing (FDD) mode.

Unlike the TDD mode, in case of the FDD mode, TTG does not exist, and RTG has a length of 45.69 us if one frame has a ¹⁄₁₆CP structure, as described with reference to FIG. 3. In this case, one frame includes three subframes having seven OFDM symbols and five subframes having six OFDM symbols. The case where the ⅛CP subframe is frequency division duplexed in the basic frame structure of a ¹⁄₁₆CP will be described with reference to FIG. 13.

FIG. 13 is a diagram illustrating another example of idle time variation according to a ratio of subframes having different cyclic prefix (CP) lengths in accordance with another embodiment of the present invention.

In FIG. 13, a basic subframe structure includes OFDM symbols having a CP length of ¹⁄₁₆Tu. In this case, the first subframe basically includes seven OFDM symbols. Also, each value has a unit of 10−6 seconds(us), and values within parentheses next to figures represent how many OFDM symbols are included in the corresponding subframe. As described above, in the FDD mode, the original idle time (IT) represents an idle time value (45.69 us) of the last part of the frame.

In case of method 1, the number of ¹⁄₁₆CP OFDM symbols of the first subframe is fixed to seven. In case of method 2, the number of ¹⁄₁₆CP OFDM symbols of the last subframe is fixed to seven.

In this case, when the number of subframes having a ⅛CP structure is 4, the total idle time is the shortest in method 2. Also, when the number of subframes having six OFDM symbols of a ⅛CP structure is 3, the total idle time is the most similar to that of the basic structure.

FIG. 14 is a diagram illustrating another example of idle time variation according to a ratio of subframes having different cyclic prefix (CP) lengths in accordance with another embodiment of the present invention.

In FIG. 14, first three subframes SF0 to SF2 are fixed to include six ¹⁄₁₆CP OFDM symbols.

In this case, when the number of subframes having six ⅛CP OFDM symbols is 1, the total idle time is the shortest. Also, when the number of subframes having six ⅛CP OFDM symbols is 2 and the number of subframes having five ⅛CP OFDM symbols is 1, the total idle time is the most similar to that of the basic structure.

6. FDD: Combination of ⅛CP(Base) and ¹⁄₁₆CP

When one frame has a ⅛CP structure, the original idle time (IT, RTG) becomes 62.28 ms. In this case, one frame includes eight subframes of six OFDM symbols. The case where the ¹⁄₁₆CP subframe is frequency division duplexed in the basic frame structure of a ⅛CP will be described with reference to FIG. 15.

FIG. 15 is a diagram illustrating another example of idle time variation according to a ratio of subframes having different cyclic prefix (CP) lengths in accordance with another embodiment of the present invention.

In FIG. 15, a basic subframe structure includes OFDM symbols having a CP length of ⅛Tu. In this case, when the number of subframes having six ¹⁄₁₆CP OFDM symbols is 2 and the number of subframes having seven ¹⁄₁₆CP OFDM symbols is 2, the total idle time is the shortest. Also, when the number of subframes having six ¹⁄₁₆CP OFDM symbols is 2 and the number of subframes having seven ¹⁄₁₆CP OFDM symbols is 2, the total idle time is the most similar to that of the basic structure.

The transmitting side and the receiving side can perform data exchange using the frame structures disclosed in the aforementioned embodiments. For example, the mobile station can receive data from the base station through at least one downlink among the aforementioned frame structures, and can transmit data to the base station through the uplink. Also, the base station can transmit data to the mobile station through at least one downlink among the aforementioned frame structures, and can receive data from the mobile station through the uplink.

At least one of four frames constituting one superframe can have any one of the aforementioned frame structures according to the present invention. At this time, control information (for example, subframe location where a CP structure different from basic CP structure starts) of the aforementioned frame structure according to the present invention can be transmitted from the base station to the mobile station through the super frame header (SFH).

As another embodiment of the present invention, the mobile station and the base station through which the embodiments of the present invention can be performed will be described.

The mobile station can be operated as a transmitter in the uplink, and can be operated as a receiver in the downlink. Also, the base station can be operated as a receiver in the uplink, and can be operated as a transmitter in the downlink. Namely, the mobile station and the base station can include a transmitter and a receiver to transmit information or data.

The transmitter and the receiver can include processor, module, part, and/or means for performing the embodiments of the present invention. Particularly, the transmitter and the receiver can include a module (means) for encoding a message, a module for decoding the encoded message, and an antenna for transmitting and receiving the message.

The mobile station used in the embodiments of the present invention can include a low power radio frequency (RF)/intermediate frequency (IF) module in addition to MAC PDU generation module. Also, the mobile station can include a means, module or part for performing controller function, medium access control (MAC) frame variable control function according to service characteristics and radio wave condition, handover function, authentication and encryption function, packet modulation and demodulation function for data transmission, quick packet channel coding function, and real-time modem control function, thereby performing the aforementioned embodiments of the present invention.

The base station can transmit data received from an upper layer to the mobile station by wireless or wire. The base station can include a low power RF/IF module. Also, the base station can include a means, module or part for performing controller function, orthogonal frequency division multiple access (OFDMA) packet scheduling, time division duplex (TDD) packet scheduling and channel multiplexing function, medium access control (MAC) frame variable control function according to service characteristics and radio wave condition, handover function, authentication and encryption function, packet modulation and demodulation function for data transmission, quick packet channel coding function, and real-time modem control function, thereby performing the aforementioned embodiments of the present invention.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

The embodiments of the present invention can be applied to various wireless access systems. Examples of various wireless access systems include 3GPP (3rd Generation Partnership Project) system, 3GPP2 system and/or IEEE 802.xx (Institute of Electrical and Electronic Engineers 802) system. The embodiments of the present invention can be applied to all technical fields to which the various access systems are applied, as well as the various access systems.

The invention claimed is:

1. A method of constructing a frame in a broadband wireless access system, the method comprising:
including at least one first subframe in the frame, the at least one first subframe including a plurality of symbols having a cyclic prefix of a first length; and
including at least one second subframe in the frame, the at least one second subframe including a plurality of symbols having a cyclic prefix of a second length different from the first length,
wherein the number of the at least one first subframe and the number of the at least one second subframe are determined to minimize an idle time for which effective symbols are not included in the frame.

2. The method of claim 1, wherein the frame is constructed by a time division duplexing (TDD) mode.

3. The method of claim 2, wherein the frame is divided into an uplink subframe region and a downlink subframe region, each of which includes a predetermined number of subframes.

4. The method of claim 3, wherein the at least one second subframe is located in the downlink subframe region.

5. The method of claim 4, wherein the at least one second subframe is located from the last part of the downlink subframe region.

6. The method of claim 3, wherein the uplink subframe region includes N (N=<7, N is a natural number) number of subframes, and the downlink subframe region includes (8−N) number of subframes.

7. The method of claim 6, wherein the N is 3, and the number of the at least one second subframe is 3.

8. The method of claim 7, wherein one of the three second subframes includes five symbols having the cyclic prefix of the second length, and the other second subframes include six symbols having the cyclic prefix of the second length.

9. The method of claim 3, wherein the idle time includes a first idle time and a second idle time, the first idle time being located between the downlink subframe region and the uplink subframe region, and the second idle time being located at the last part of the uplink subframe region.

10. The method of claim 9, wherein the number of the at least one first subframe and the number of the at least one second subframe are determined to fix the second idle time to a predetermined value and minimize the first idle time.

11. The method of claim 1, wherein the frame is constructed by a frequency division duplexing (FDD) mode.

12. The method of claim 11, wherein the number of the at least one first subframe is M (M=<7, M is a natural number), and the number of the at least one second subframe is (8−M).

13. The method of claim 12, wherein the at least one second subframe is located at the last part of the frame.

14. The method of claim 13, wherein the M is 5, and each of the at least one second subframe includes six symbols having the cyclic prefix of the second length.

15. The method of claim 1, wherein the first length corresponds to $1/16$ of an effective symbol interval of one of the plurality of symbols, and the second length corresponds to $1/8$ of the effective symbol interval.

16. The method of claim 1, wherein the at least one first subframe includes unicast data, and the at least one second subframe includes multicast or broadcast data.

* * * * *